Patented Nov. 10, 1931

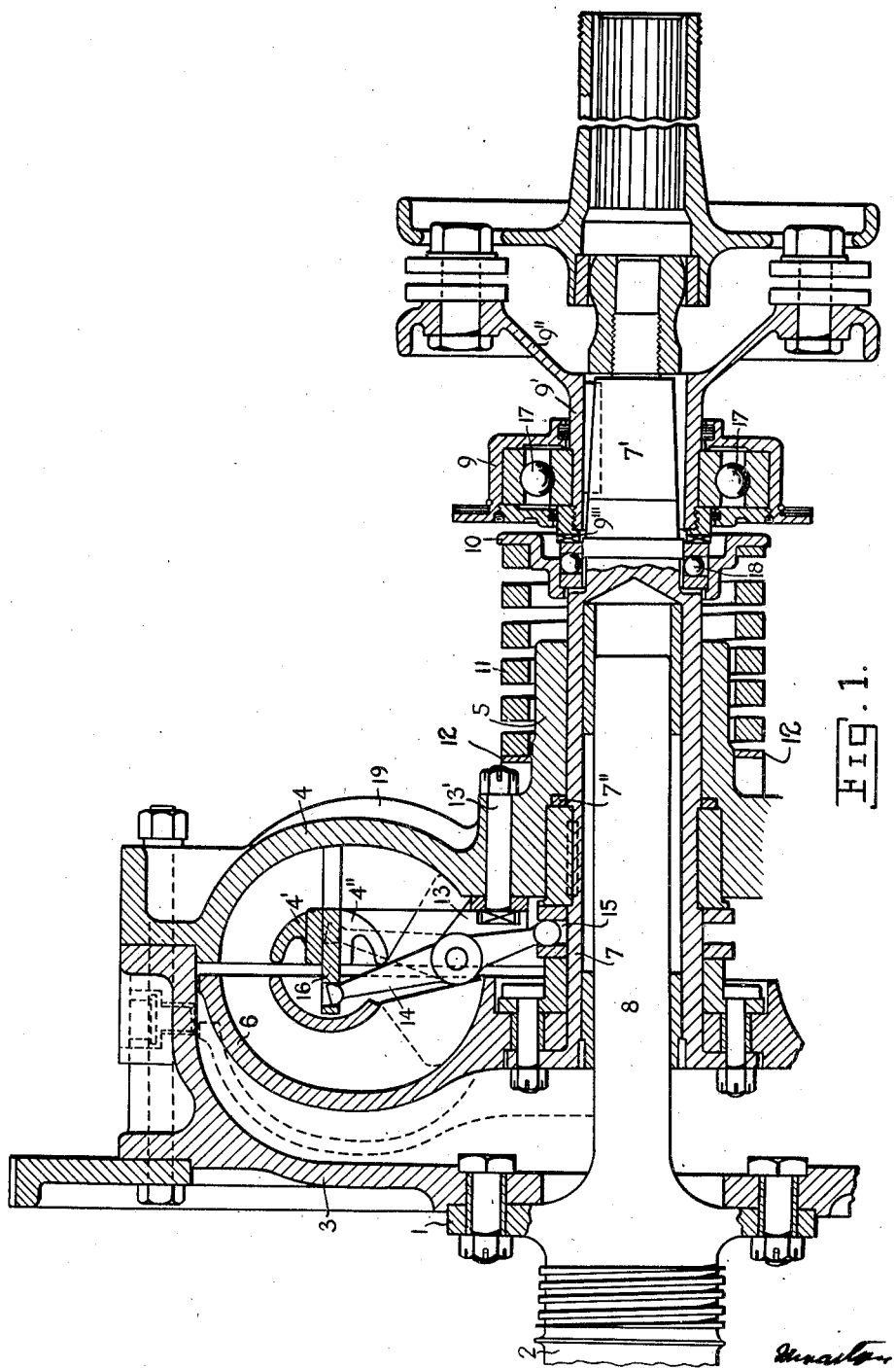

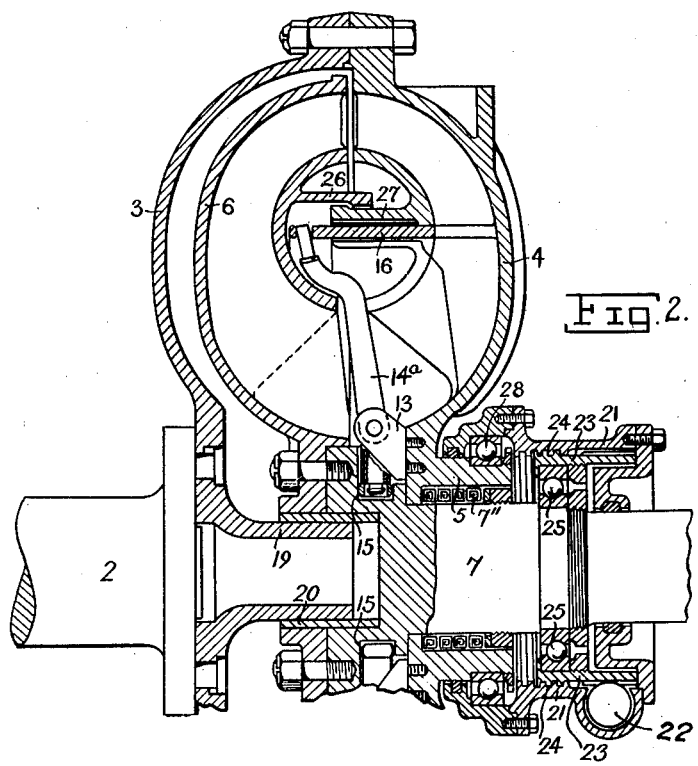

1,831,770

UNITED STATES PATENT OFFICE

HAROLD SINCLAIR, OF SURBITON HILL, ENGLAND

POWER TRANSMISSION MECHANISM AND CLUTCH

Application filed March 16, 1929, Serial No. 347,703, and in Great Britain April 16, 1928.

This invention relates to power transmission mechanism, in which any type of prime mover or motor is employed and speed variation of the driven shaft is required, and in particular to power transmission mechanism for use where internal combustion engines (or other prime movers having similar characteristics) are used for driving machinery which is frequently started and stopped under load, as in the case of road vehicles, locomotives, tractors, cranes, navvies, winches, excavating and dredging machinery, and the like.

For power transmission of the latter description the clutch connecting the engine with the driven machine is an important element, and various means have been proposed to improve the action of the clutch and assist the engine to take up the drive smoothly and without stalling.

One known arrangement is for example that in which a clutch is worked in combination with a hydraulic coupling, the degree of filling of which is constant, and a variable ratio gear box, advantage being taken of the inherent variation in "slip" of the coupling with change of speed to secure an improved transmission. In this case the friction clutch is provided to meet the rapid clutching and de-clutching requirements of gear changing.

Experience with this type of transmission shows that whereas advantage results inter alia from the natural variation in the "slip" according to the speed and torque of the engine, there are circumstances in which it is desirable to vary the inherent "slip"/speed characteristics of the coupling rapidly and at will.

For example it is an advantage to be able to increase the "slip" considerably or conversely to reduce the torque at any time desired e. g. at the moment of changing gear and when the vehicle is starting from rest; or for example when the vehicle is held stationary with a gear in mesh and the friction clutch referred to in the above mentioned arrangement is also in engagement. In the latter case the "slip" is 100%, and the torque load imposed on the engine by a normal hydraulic coupling is therefore considerable, necessitating a well opened throttle to avoid accidental stoppage of the engine when thus "idling".

It will be furthermore be seen that if the "slip" of a constantly filled hydraulic coupling can be increased rapidly at will, the friction clutch normally used for changing gear may no longer be required, since the necessary disengagement of load may be effected by the hydraulic coupling.

Similarly if means can be provided for regulating the slip of a hydraulic coupling, at will, without necessarily changing the degree of filling of the coupling, a convenient means is provided of obtaining a variable speed drive from a prime mover adapted to run at constant speed and it is one of the objects of the invention to secure this result.

The present invention makes use of a hydraulic coupling of the Föttinger type in which, in the normal working condition of minimum slip, when the liquid passages and vanes incorporated in the primary and secondary elements respectively are in proximity or register with one another, the said passages constitute substantially continuous or uninterrupted hydraulic circuits connecting the two elements.

In hydraulic couplings of the Föttinger type it has already been proposed to employ a valve which does not rotate with either element of the coupling and which can be moved at will into the hydraulic circuit to restrict the flow of liquid therein, but such couplings require the provision of a non-rotating external casing to retain the working fluid, which stationary casing results in heavy fluid friction losses. It has also been proposed in hydraulic couplings in which the coupling is not mainly hydraulic, for example when gearing is provided between the primary and secondary elements of the coupling, to provide means for adjusting the normal circulation of liquid in the coupling and for this purpose one element has been made axially slidable relatively to the other element.

According to the present invention there is provided a hydraulic coupling of the Föttinger type, adapted to function independently of any fixed casing and in which the connection between the elements of the coupling is mainly hydraulic, that is to say in which no gearing is provided to determine the relative speeds of the two elements, comprising primary and secondary elements provided with liquid passages and vanes adapted when in register with one another to form substantially continuous or uninterrupted hydraulic circuits, characterized by the provision of means, adapted to rotate with said primary or secondary element or with both for controlling the normal circulation of liquid between said elements and thus regulating the slip without any necessary variation in the quantity of liquid within the coupling.

A hydraulic coupling which operates equally well in either direction of rotation for example one having straight blades on both elements, may advantageously be used in many cases.

The coupling, may, if desired, be used in conjunction with a variable ratio transmission gear, or in conjunction with a change-motion clutch mechanism.

The invention will be described by way of example with reference to the accompanying drawings in which Figs. 1 and 2 illustrate two constructional forms of the invention in longitudinal sectional elevation.

Fig. 1 of the drawings shows a type of coupling most conveniently adapted for use with internal combustion engines in which rapid variation of the "slip" is desired e. g. for gear changing purposes on motor vehicles and locomotives, also for excavators and like machinery.

Referring to Fig. 1 there is bolted on the flange 1 of the crank shaft 2 a driving casing member 3 to which is bolted in turn the impeller or primary element 4 of the coupling, which is provided with a boss 5. The runner or secondary element 6 of the coupling is bolted to and carried by a sleeve shaft 7 which rotates upon an extension 8 of the crank shaft 2. Mounted to rotate on ball bearings 17 relatively to the boss 9' of the flexible coupling 9" is a member 9, adapted to be displaced towards the left in Fig. 1, by means of a pedal (not shown) such as a clutch pedal, the boss 9' being secured to the extension 7' of the shaft 7. When the clutch pedal is depressed the member 9 is moved to the left in Fig. 1 carrying with it the boss 9', the shaft 7', the sleeve shaft 7 and the runner element 6 which are still free to rotate by virtue of the ball bearing 17. At the same time the shoulder 9''' presses through a thrust race 18 against a shoulder of the flanged ring 10 which is mounted to rotate with the impeller element 4 relatively to the sleeve shaft 7, and this ring 10 is displaced towards the left, against the action of a coiled spring 11 which is compressed between the ring 10 and a shoulder 12 on the boss 5.

At three points 120° from one another on the interior of the impeller element 4, are mounted brackets 13, secured to the boss 5 by bolts 13', on which brackets are pivoted levers 14. The lower end of each lever is ball shaped and engaged in a channel 15 between hardened surfaces upon the sleeve shaft 7, so that when the shaft 7 is moved axially, the lever 14 is rocked upon the lug 13. The upper end of each lever 14 is also ball shaped and engages in an aperture in a ring 16 adapted to slide in axial direction within circumferential slot in the core 4' of the impeller element 4, the core 4' being also slotted radially at 4'' to allow of the full movement of the lever 14. When the levers 14 are rocked in the manner described the ring 16 will be moved axially of the impeller element 4 and will close to a greater or less extent the path of flow of the liquid of the coupling normally from the centre towards the periphery of the impeller 4 and so reduce the driving action of the liquid on the runner element 6 or conversely increase the slip for a given torque transmission. Simultaneously the runner 6 is withdrawn to a greater or less extent towards the left in Fig. 1 and away from the impeller 4, so that while the flow of liquid from the impeller to the runner is reduced by the checking valve action of the ring 16, the driving effect of the liquid which does flow past the ring 16, upon the runner, is also to some extent reduced.

A gland ring adapted to take the thrust of the spring 11 is provided at 7'' and serves to prevent leakage of liquid between sleeve shaft 7 and boss 5.

On the exterior of the impeller element 4 are provided (for example eight) ribs 19 for the purpose of strengthening the casting and for cooling the liquid used in the coupling.

It will be clear that in this arrangement the circulation of liquid in the coupling is controlled on the one hand by the parts 9', 7', 7 and 15, which rotate with the runner 6 and by the parts 14 and 16 which rotate with the impeller 4, and on the other hand by the means for moving the runner 6 axially. It is not essential that the runner 6 be moved axially. The main control is by the axial movement of the member 16. It is also important that the outlets of the driving member and the inlets of the driven member be upon opposite sides of a transverse medial plane, so that the liquid in passing from the driving to the driven member moves in an axial direction at the maximum distance from the axis of rotation where the effect of centrifugal force is the greatest. It is also important that the member 16 be spaced inwardly from the outer periphery of the coupling where the force exerted on the member by the liquid subjected to the action of centrifugal force is comparatively low in respect to what it is at the outlets of the passages in the driving member.

In Fig. 2, the coupling is adapted for control of the slip by means of a hand wheel and this is suitable for use in plant of large size and where very rapid control of the slip is not so essential as in Fig. 1. The casing member 3 is mounted as before on the engine crank shaft 2 and carries the impeller element 4, the boss 5 of which is rotatable upon the runner shaft 7. At the left hand end in Fig. 2 this shaft has a bearing on the spigot 19 of the casing member 3, 20 being a spigot bearing bush. In a stationary housing 21 is mounted a screwed shaft 22 adapted to be rotated by a hand wheel (not shown), and this shaft engages with skew gear teeth for example on the sleeve 23 which it rotates within the housing 21. The sleeve 23 is externally threaded at 24, the thread engaging with a corresponding thread in the housing, so that when the sleeve is rotated it is moved axially to the right or left within the housing. The sleeve 23 is rotable relatively to the runner shaft 7, ball bearings 25 being provided therebetween but movement of the sleeve 24 axially also moves shaft 7 axially, and with it the runner, through the ball bearing 25 which is fixed axially relatively to sleeve 23 and shaft 7. A gland to prevent leakage of liquid may be provided at 7″.

Mounted on the boss 5 of the impeller 4, on the inside of the coupling, at four points at 90° to one another, are four brackets 13 on which are pivoted levers 14ᵃ, the inner ends of which engage, with rolling contact, in a groove 15 in the shaft 7, while the outer ends engage with the ring valve 16, mounted to slide axially in the core of the impeller 4. When the shaft 22 is rotated in such a direction as to move sleeve 23 towards the left in Fig. 2 for example, the shaft 7 and runner 6 move correspondingly towards the left and the levers 14ᵃ are rocked causing the ring valve 16 to be moved towards the right, thus closing to a greater or less extent the passage through which the liquid in the coupling flows normally outwards in the impeller 4 and thus varying the driving action on the runner or conversely regulating the "slip" for any given torque.

From the cores of the runner and impeller respectively extend axial flanges 26 and 27, the over-lapping surfaces of which, when the runner and impeller are moved apart, form a seal to prevent a flow of the liquid in a radial direction in the space between impeller and runner.

Similar axial flanges may be provided if desired, and with the same object, in the case of the coupling shown in Fig. 1.

Ball bearings 28 serve to locate the housing 21 relatively to the impeller boss 5. The shaft 7 may be splined or connected by a slidable flexible coupling to the shaft to be driven thereby, to allow for the end movement of the former.

I claim:
1. A hydraulic coupling of the Föttinger type, a comprising primary and secondary elements provided with cooperating vanes, the passages between said vanes constituting hydraulic circuits, an annular core within said hydraulic circuits, and an annular member normally located within said core and movable relatively to both of said elements into said hydraulic circuits.

2. A hydraulic coupling of the Föttinger type, comprising driving and driven rotors provided with vanes and inner portions cooperating to form an inner core encircled by hydraulic circuits between said vanes, an annular member carried by one of said rotors and normally housed within said core, and means for moving said member axially of the coupling to close the passages in said last mentioned rotor.

3. A hydraulic coupling of the Föttinger type, comprising driving and driven rotors provided with vanes and inner portions cooperating to form an inner core encircled by hydraulic circuits between said vanes, an annular member carried by one of said rotors and normally housed within said core, a shaft coaxial with said rotors and connected to one of them, and a member slidable axially of said shaft for moving said annular member into and out of the passages of one of said rotors.

4. A hydraulic coupling of the Föttinger type, comprising driving and driven rotors provided with vanes and inner portions cooperating to form an inner core encircled by hydraulic circuits between said vanes, an annular member carried by one of said rotors and normally housed within said core, and means for simultaneously moving said member axially in one direction and one of said rotors axially in the opposite direction.

5. A hydraulic coupling of the Föttinger type, comprising driving and driven rotors provided with cooperating vanes, the passages between said vanes constituting hydraulic circuits, an annular member carried by one of said rotors and normally encircled by said hydraulic circuits, and means for simultaneously moving said member axially in one direction and the other of said rotors axially in the opposite direction.

6. A hydraulic coupling of the Föttinger type, including a pair of dished disks provided with vanes and intervening passages forming driving and driven members juxtaposed for the circulation of a liquid in a vortex ring, a core around which the liquid circulates, the outlets from the passages of the driving member and the inlets to the passages of the driven member being opposed in substantially radial planes beyond the outer periphery of said core, and a substantially cylindrical sleeve carried by one of said members and of a diameter substantially less than that of the outer periphery of said core and greater than that of the inner periphery of said core, and means for moving said sleeve axially into or out of the path of flow of the liquid circulated in said coupling.

In testimony whereof I have signed my name to this specification.

HAROLD SINCLAIR.